(No Model.) 2 Sheets—Sheet 2.
C. F. BARRETT.
ANIMAL TRAP.
No. 286,252. Patented Oct. 9, 1883.
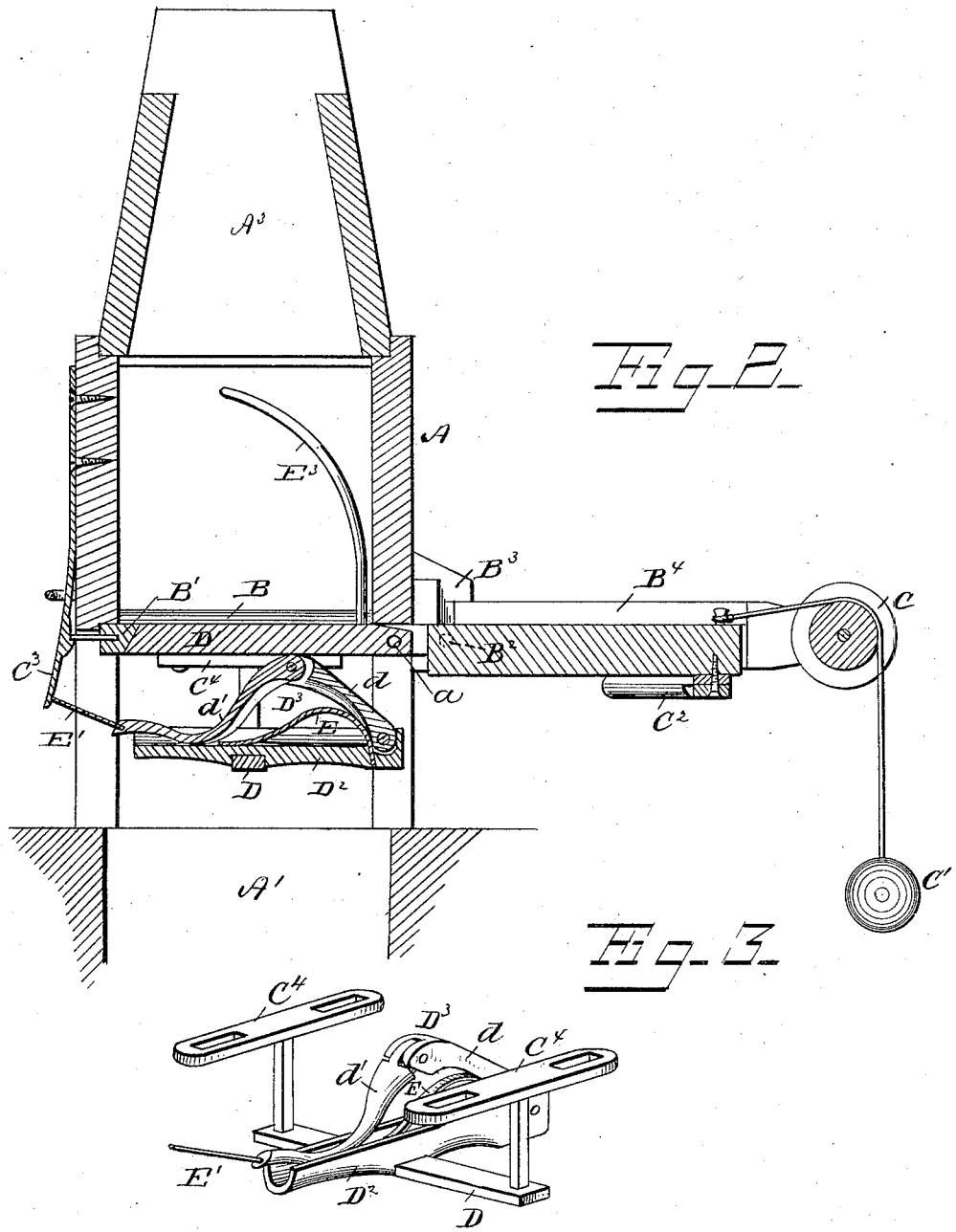

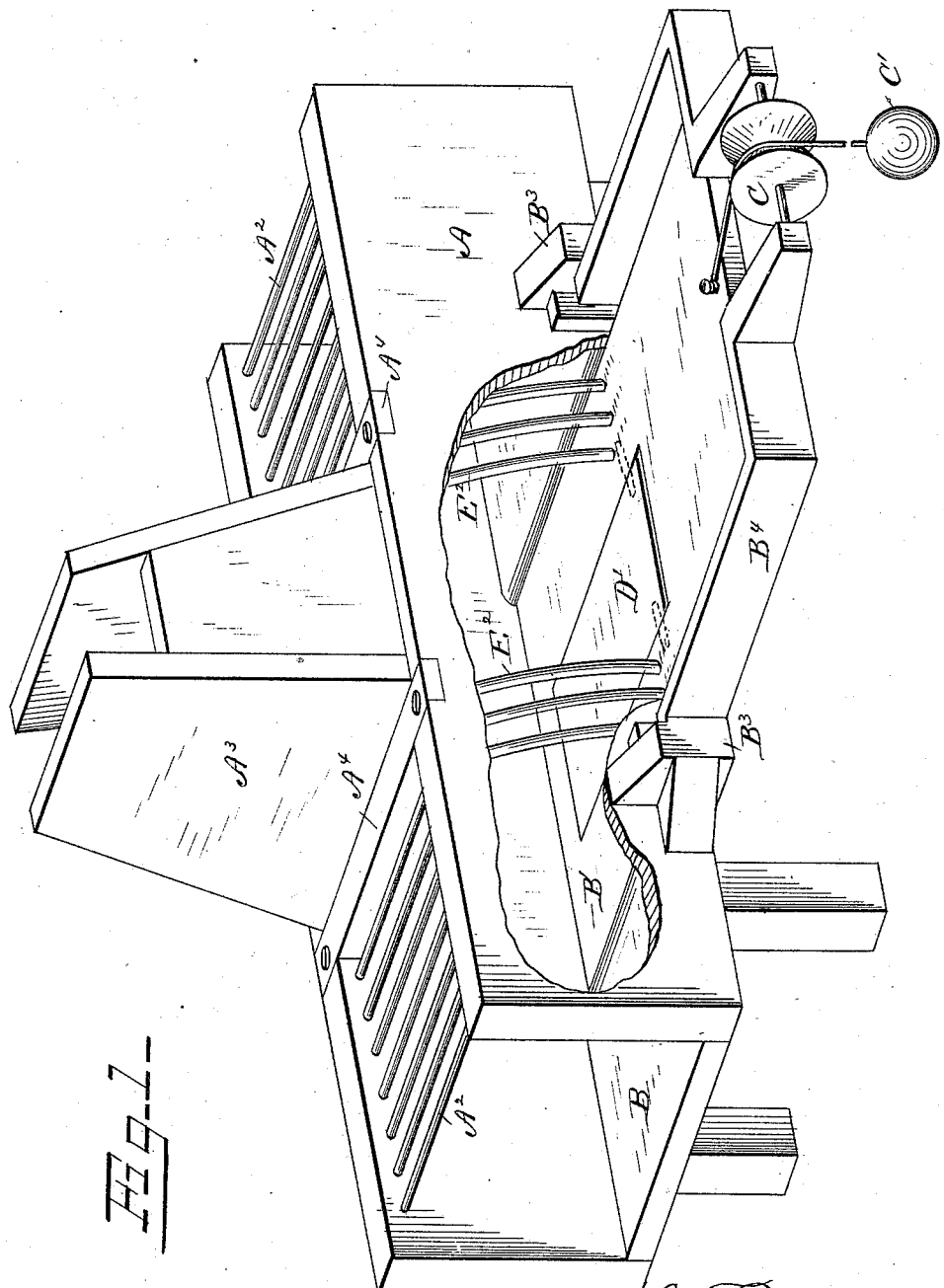

UNITED STATES PATENT OFFICE.

CHARLES F. BARRETT, OF VALLEY MILLS, INDIANA.

ANIMAL-TRAP.

SPECIFICATION forming part of Letters Patent No. 286,252, dated October 9, 1883.

Application filed June 4, 1883. (No model.)

*To all whom it may concern:*

Be it known that I, CHARLES F. BARRETT, a citizen of the United States, residing at Valley Mills, in the county of Marion and State of Indiana, have invented a new and useful Animal-Trap, of which the following is a specification, reference being had to the accompanying drawings.

This invention relates to certain new and useful improvements in animal-traps; and it has for its object to provide a trap which shall automatically unlock or unset itself by the weight of the animal, and which shall automatically reset itself after each animal has been caught; and with these ends in view it consists in a body or trough, preferably of rectangular form, adapted to set over a pit, a barrel, or other receptacle, and provided with a hinged bottom having a trap-door pivoted thereto, and adapted to release or actuate the locking devices, said bottom being also provided with a counterbalance-weight, by which it is returned to its normal position, the several peculiarities of which will hereinafter more fully appear.

In the accompanying drawings, forming a part of this specification, and on which like letters of reference indicate corresponding parts, Figure 1 represents a perspective view of my animal-trap, one of the sides of the trough thereof being broken away in order to show more clearly the internal parts; Fig. 2, a transverse vertical sectional view thereof, and Fig. 3, a detached view, in perspective, of the releasing-bolt and the bracket which carries the same.

The letter A indicates the body or trough of my trap, the same being constructed, preferably, of wood, and of rectangular form, and is provided with supporting-legs, whereby it is suspended over a pit or other receptacle, A'. The top of the trough is provided with a suitable number of cross-bars, A², forming an open top. It is also provided with a cupola, A³, which fits upon suitable rabbets formed in the upper edges of the sides, cross-bars A⁴ being secured at either side of the cupola in order to hold the same in place.

The letter B indicates the fixed floor of the trough, and the letter B' the hinged or pivoted portion of the floor, this portion being adapted to oscillate upon the trunnions B², extending from each side thereof and fitting in vertical slots formed in the blocks B³, which are secured to one side of the trough. Extending from the said blocks is a frame, B⁴, in which is journaled the shaft of a grooved pulley, C. Secured to the pivoted floor or bottom B', at its outer end, is a rope or chain, which passes over the pulley C, and is provided with a counterbalance-weight, C', whereby the said pivoted floor is returned to its normal position after the animal has been dropped into the pit below. The under side of the pivoted bottom, near its outer end, is also provided with pivoted arms C², which are adapted to be swung out under the frame B⁴, forming a lock to prevent the pivoted bottom from operating when it is desired not to use the trap. The other end of the said pivoted bottom is provided with a stud, which engages the inner side of a notched spring-catch, C³, which is secured to that side of the trough. These devices support the pivoted bottom when the animal is upon it, and are adapted to become disengaged, as will presently appear. To the under side of this portion of the bottom are secured two slotted adjustable bars, C⁴, carrying a depending hanger or frame, D, the object of the slots being to adjust the hanger at different distances from the pivotal point of the trap-door D', to be presently described, so as to vary the leverage which the weight of the animal will have over the unlocking device, whereby the trap may be set to drop by the action of different weights.

In Fig. 2 of the drawings the hanger D is shown at its rear limit of adjustment, when it will require the least power to operate the trap-door and locking mechanism. As the hanger is adjusted forward from the hinge *a* of the trap-door, greater pressure will be required to operate the door and the unlocking mechanism. When the hanger is adjusted forward, the pin E' presses out spring C³, and when adjusted rearwardly the spring C³ follows up the pin E'.

It will be understood that the hanger can be adjusted so as to move the lower end of the spring C³ some distance without disengaging the stud from the notch of the spring, and the hanger cannot be adjusted in either direction far enough to disengage the stud and notch, The pivoted bottom is provided with a hatchway, in which is pivoted or hinged, as shown at $a$, the trap-door $D'$. Upon the cross-bar of the hanger $D$ is fitted a longitudinally-grooved bar, $D^2$, to which is pivoted a bolt, $D^3$, consisting of two parts, $d\ d'$, the part $d$ being supported in a partially-elevated position by means of a spring, $E$, secured rigidly at one end to the bar $D^2$, and the part $d'$ being of curved form and adapted to reciprocate in the groove formed in the bar $D^2$ whenever pressure is brought upon the bolt at the point of connection of the two parts. The free end of the part $d'$ has extending from it a stud or pin, $E'$, which stud, whenever the bolt is distended in the manner to be presently described, acts upon the depending end of the spring-catch, to disengage its notched portion from the stud extending from the pivoted bottom.

It will be observed by reference to Fig. 2 that the trap-door is supported by resting upon the jointed bolt $D^3$, so that whenever the weight of the animal bears upon this door the effect is to distend the jointed bolt $D^3$ and cause the unlocking of the pivoted bottom, as above stated.

In order to prevent the animal from escaping and insure catching him, I have provided the upper side of the pivoted bottom with curved arms $E^2$, which act to engage the back of the animal and prevent his escape should he in any manner rebound or jump upward.

The operation of my invention will be readily understood when taken in connection with the above description, and is as follows: The trap being set over a pit or receptacle, and bait placed upon the trap-door, the animal is induced to enter the trough. When the animal's weight is brought to bear upon the trap-door, the bolt is distended and the stud on one of its members engages the lower end of the spring-catch and allows the pivoted bottom to swing down, carrying the trap-door and the animal with it. When the door is swung far enough down to cause the animal to lose his foothold and to drop into the pit, the counterbalance-weight returns the pivoted bottom to its normal position, its stud again engages the spring-catch, and the trap is thus set ready for another animal.

Having thus fully described my invention, what I claim as new, and desire to secure by Letters Patent, is—

1. In an animal-trap, the combination, with the trough having a fixed floor and a spring-catch, of the pivoted floor having the trap-door pivoted thereto, and the bolt adapted to support the trap-door and to be distended thereby, whereby the trap is unlocked by the weight of the animal, substantially as shown and described.

2. In an animal-trap, the combination, with the pivoted bottom carrying an adjustable hanger, of the pivoted trap-door and jointed bolt adapted to support the trap-door, as and for the purpose set forth.

3. In an animal-trap, a jointed bolt adapted to be actuated by the pressure of the animal so as to unlock the trap, the said bolt consisting of two parts pivoted together and to a bar provided with a supporting-spring and a longitudinal slot for supporting and guiding the parts of the bolt, substantially as shown and described.

In testimony that I claim the foregoing as my own I have hereto affixed my signature in presence of two witnesses.

CHARLES F. BARRETT.

Witnesses:
A. J. JOYCE,
JACOB F. SCHOLL.